(12) United States Patent
Kuno et al.

(10) Patent No.: US 10,766,151 B2
(45) Date of Patent: Sep. 8, 2020

(54) FAILURE DIAGNOSIS DEVICE AND FAILURE DIAGNOSIS METHOD

(71) Applicant: NISSAN MOTOR CO., LTD., Kanagawa (JP)

(72) Inventors: Masaki Kuno, Kanagawa (JP); Toshimichi Urakawa, Kanagawa (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 15/576,442

(22) PCT Filed: May 22, 2015

(86) PCT No.: PCT/JP2015/064742
§ 371 (c)(1),
(2) Date: Nov. 22, 2017

(87) PCT Pub. No.: WO2016/189584
PCT Pub. Date: Dec. 1, 2016

(65) Prior Publication Data
US 2018/0154530 A1 Jun. 7, 2018

(51) Int. Cl.
*B25J 19/06* (2006.01)
*G05B 19/406* (2006.01)
(Continued)

(52) U.S. Cl.
CPC .............. *B25J 19/06* (2013.01); *B25J 9/1674* (2013.01); *B25J 13/085* (2013.01); *G01L 3/00* (2013.01);
(Continued)

(58) Field of Classification Search
CPC ........ B25J 19/06; B25J 9/1674; B25J 13/085; G01L 3/00; G01L 5/00; G05B 19/406;
(Continued)

(56) References Cited

U.S. PATENT DOCUMENTS 3,651,465 A * 3/1972 Law ...................... B07C 5/3412
340/5.8
5,381,341 A * 1/1995 Herrala ..................... D21F 7/06
162/252
(Continued)

FOREIGN PATENT DOCUMENTS

EP 0604663 A1 7/1994
EP 1072388 A2 1/2001
(Continued)

OTHER PUBLICATIONS

Feldblum (S. Feldblum and et al, "The Minimum Bias Procedure—A Practitioner s Guide", The Casualty Actuarial Society Forum, Fall 2002 Edition2002) (Year: 2002).*
(Continued)

*Primary Examiner* — Alexander Satanovsky
*Assistant Examiner* — Douglas Kay
(74) *Attorney, Agent, or Firm* — Osha Liang LLP

(57) ABSTRACT

A failure diagnosis device applicable to a mechanical device provided with a motor as a source to drive a motion axis, and configured to acquire a moving position of the motion axis and a disturbance torque value applied to the motion axis every predetermined period, and to diagnose that a failure is occurring when the disturbance torque value is larger than a failure determination threshold, includes a disturbance torque selector configured to calculate a change from a reference value of each of the acquired disturbance torque values, and to accumulate the disturbance torque values except each disturbance torque value having the change from the reference value equal to or larger than a predetermined threshold, and a failure diagnosis unit configured to diagnose a failure of the mechanical device by using the disturbance torque values accumulated by the disturbance torque selector.

8 Claims, 4 Drawing Sheets

(51) Int. Cl.
*B25J 9/16* (2006.01)
*B25J 13/08* (2006.01)
*G01L 3/00* (2006.01)
*G01L 5/00* (2006.01)

(52) U.S. Cl.
CPC .............. *G01L 5/00* (2013.01); *G05B 19/406* (2013.01); *G05B 2219/37525* (2013.01); *G05B 2219/37536* (2013.01); *G05B 2219/37624* (2013.01); *G05B 2219/39355* (2013.01)

(58) Field of Classification Search
CPC ........... G05B 2219/37525; G05B 2219/37536; G05B 2219/37624; G05B 2219/39355
USPC ........................................................ 702/183
See application file for complete search history.

(56) References Cited

U.S. PATENT DOCUMENTS

| | | | | |
|---|---|---|---|---|
| 5,631,851 | A * | 5/1997 | Tanaka | G05B 19/4062 700/174 |
| 5,719,479 | A | 2/1998 | Kato et al. | |
| 5,913,241 | A * | 6/1999 | Ohashi | B60C 23/061 73/146 |
| 5,914,830 | A * | 6/1999 | Kadlec | G11B 5/5534 360/78.09 |
| 6,409,495 | B1 * | 6/2002 | Kamiguchi | B29C 45/844 264/40.1 |
| 7,957,877 | B2 * | 6/2011 | Makiyama | B60G 17/0162 180/197 |
| 8,356,207 | B2 * | 1/2013 | Hosek | G05B 23/0235 702/184 |
| 9,124,212 | B2 * | 9/2015 | Shimoda | H02P 23/14 |
| 9,701,014 | B2 * | 7/2017 | Oguri | B25J 9/1612 |
| 2002/0059035 | A1 * | 5/2002 | Yagi | H02S 50/10 702/59 |
| 2003/0163286 | A1 * | 8/2003 | Yasugi | G05B 19/4065 702/185 |
| 2004/0080067 | A1 * | 4/2004 | Yamazaki | B29C 45/7653 264/40.1 |
| 2010/0060212 | A1 * | 3/2010 | Negoro | B60L 7/14 318/400.3 |
| 2011/0054680 | A1 * | 3/2011 | Nakata | B25J 9/1674 700/245 |
| 2011/0259446 | A1 * | 10/2011 | Ueki | F23K 5/005 137/487.5 |
| 2012/0011180 | A1 | 1/2012 | Kavaklioglu | |
| 2014/0197770 | A1 * | 7/2014 | Shimoda | H02P 23/14 318/490 |
| 2018/0147735 | A1 * | 5/2018 | Kuno | B25J 19/06 |
| 2020/0011787 | A1 * | 1/2020 | Dalby | G01J 3/12 |

FOREIGN PATENT DOCUMENTS

| | | | | |
|---|---|---|---|---|
| JP | H06-082346 | A | | 3/1994 |
| JP | H08-066893 | A | | 3/1996 |
| JP | 09174482 | A | * | 7/1997 |
| JP | H09-174482 | A | | 7/1997 |
| JP | 11320477 | A | * | 11/1999 |
| JP | H11-0320477 | A | | 11/1999 |
| JP | 3080617 | B1 | | 8/2000 |
| JP | 3623582 | B2 | * | 2/2005 |
| JP | 5893684 | B2 | * | 3/2016 ............ B25J 9/1612 |

OTHER PUBLICATIONS

Weldin (O. Weldin and et al, "D3.1 Data filtering methods", ROADIDEA 215455 www.roadidea.edu, 2008) (Year: 2008).*

M. Kantardzic, "Data Mining: Concepts, Models, Methods, and Algorithms", Wiley-IEEE Press 2011 'Edition: 2, pp. 520' (Year: 2011).*

* cited by examiner

FAILURE DIAGNOSIS DEVICE AND FAILURE DIAGNOSIS METHOD

BACKGROUND

Technical Field

The present invention relates to a failure diagnosis device applicable to a mechanical device provided with a motor as a source to drive a motion axis, and to a method thereof.

Related Art

Patent Literature 1 has been disclosed as a conventional failure diagnosis method applicable to an articulated industrial robot. In the failure diagnosis method disclosed in Patent Literature 1, a moving position of a joint axis of a robot and disturbance torque applied to the joint axis are detected every predetermined period while the robot is in operation, and an average value of the disturbance torque is obtained for each detected moving position. Then, the average value is compared with a set threshold and the robot is diagnosed as having an abnormality or a failure when the average value exceeds the set threshold. As described above, the conventional technique has been designed to diagnose a failure based on determination as to whether or not the disturbance torque exceeds the certain set threshold. Thus, an abnormality in a robot drive system used to be detected irrespective of a motion posture of the robot or a weight of a workpiece or the like to be gripped with a robot hand.

Patent Literature 1: Japanese Patent Application Publication No. H 9-174482

SUMMARY OF INVENTION

However, in case of an emergency shutdown of a facility, the robot hand is suddenly stopped during its operation and an abrupt load is applied to its motion axis. As a consequence, a value of the disturbance torque changes significantly and causes a one-off abnormal value. Continued operation of the failure diagnosis by using the certain set threshold without eliminating such effects of one-off abnormal values may lead to frequent occurrence of diagnoses as being abnormal in spite of being nominal as a matter of fact, thus causing deterioration in failure diagnosis accuracy.

In the meantime, a method of cooperating with a production management system can be thought as a method of acquiring emergency stop information on a facility. However, construction of the production management system may generate large amounts of investments and maintenance costs.

One or more embodiments of the present invention provides a failure diagnosis device and a method thereof, which are capable of improving failure diagnosis accuracy by eliminating effects of one-off abnormal values, and of diagnosing a failure with a low-cost system configuration.

In a failure diagnosis device and a method thereof according to one or more embodiments of the present invention, a change from a reference value of each of acquired disturbance torque values is calculated, and the disturbance torque values are accumulated while excluding each disturbance torque value having the change from the reference value equal to or larger than a predetermined threshold.

DETAILED DESCRIPTION

Embodiments of the present invention will be described below with reference to the drawings. In the description of the drawings, the same constituents are denoted by the same reference signs and explanations thereof are omitted. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

[Configuration of Failure Diagnosis System]

Figure 1:
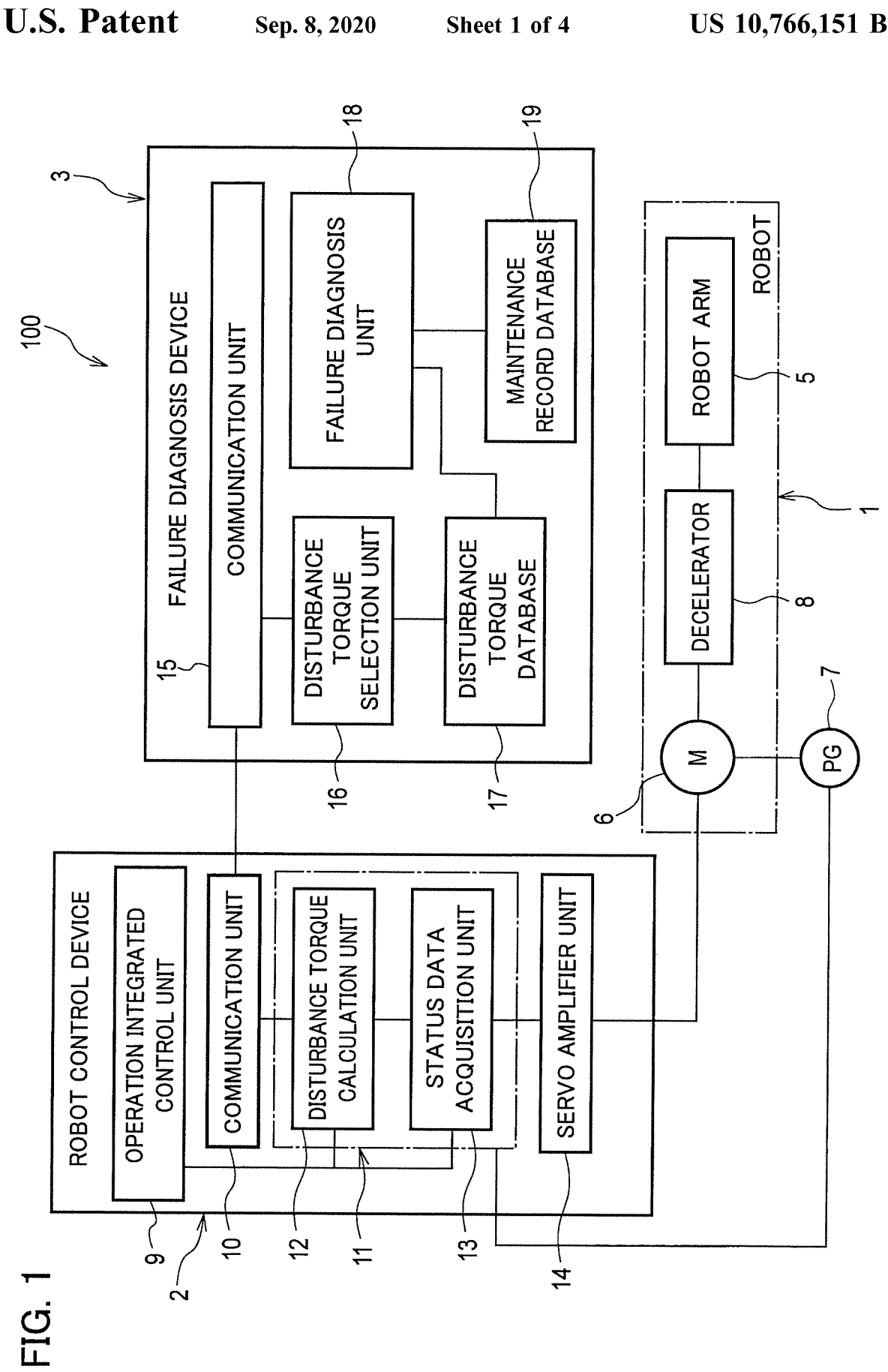
FIG. 1 is a block diagram showing an overall configuration of a failure diagnosis system according to one or more embodiments of the present invention.

FIG. 1 is a block diagram showing a configuration of a failure diagnosis system including a failure diagnosis device according to one or more embodiments of the present invention. As shown in FIG. 1, a failure diagnosis system 100 of one or more embodiments of the present invention is formed from a robot 1, a robot control device 2, and a failure diagnosis device 3. As an example of a mechanical device, the robot 1 is a robot of a multi-axis-machine teaching-play back type and also of an articulated type. However, the robot 1 may be a single-axis machine instead of being the multi-axis machine.

Although the robot 1 includes multiple motor drive systems serving as joint axes that are motion axes, FIG. 1 illustrates a motor drive system just for one axis. A robot arm 5 is driven by a servo motor (hereinafter simply referred to as a motor) 6 through a decelerator 8. A pulse coder (a pulse generator or an encoder) 7 being a detector for a rotation angle position and a velocity is attached to the motor 6.

The robot control device 2 includes an operation integrated control unit 9, a communication unit 10, a servo control unit 11, and a servo amplifier unit 14. The servo control unit 11 includes a disturbance torque calculation unit 12 and a status data acquisition unit 13, and drives the motor 6 through the servo amplifier unit 14 by receiving an instruction from the host operation integrated control unit 9. The pulse coder 7 attached to the motor 6 forms a feedback loop in conjunction with the servo control unit 11 in order for control processing of the rotation angle position and the velocity of the motor 6.

In addition to the disturbance torque calculation unit 12 and the status data acquisition unit 13, the servo control unit 11 includes a processor which performs processing for controlling the rotation angle position, the velocity, and a current of the motor 6, a ROM which stores a control program, and a non-volatile storage unit which stores set values and various parameters. Moreover, the servo control unit 11 includes a RAM which temporarily stores data in the course of computation processing, a register for detecting an absolute rotation angle position of the motor 6 by counting position feedback pulses from the pulse coder 7, and the like.

Incidentally, the robot 1 includes multiple joints and therefore requires as many motor drive systems as illustrated in FIG. 1 as the number of joints. Nonetheless, FIG. 1 illustrates the motor drive system just for one axis and illustration of the rest of the motor drive systems is omitted therein. In the meantime, a speed change gear train may be interposed between the motor 6 and the decelerator 8 in FIG. 1 as appropriate.

The operation integrated control unit 9 is ranked higher than the servo control unit 11 and governs direct control of operations of the robot 1. The communication unit 10 transfers necessary data to and from a communication unit 15 in the failure diagnosis device 3 to be described later through a LAN, for example. Meanwhile, the status data acquisition unit 13 has a function to regularly collect various types of data concerning operating statuses of the respective joint axes of the robot 1. The collected data include data indicating a collection period. The disturbance torque calculation unit 12 has a function to calculate a disturbance torque value based on the data acquired by the status data acquisition unit 13. Since the servo control unit 11 is designed to include the disturbance torque calculation unit 12 and the status data acquisition unit 13, the disturbance torque value obtained by the calculation of the disturbance torque calculation unit 12 is outputted to the failure diagnosis device 3 through the communication unit 10. According to this configuration, the servo control unit 11 takes the form of so-called software servo.

The failure diagnosis device 3 includes the communication unit 15, a disturbance torque selection unit 16, a disturbance torque database 17, a failure diagnosis unit 18, and a maintenance record database 19. Here, the failure diagnosis device 3 is formed of a general-purpose electronic circuit inclusive of a microcomputer, a microprocessor, and a CPU, and of a peripheral device such as a memory. Accordingly, the failure diagnosis device 3 operates as the communication unit 15, the disturbance torque selection unit 16, and the failure diagnosis unit 18 by executing specific programs.

The communication unit 15 has a function to transfer the necessary data to and from the aforementioned communication unit 10 in the robot control device 2 through the LAN, for example.

The disturbance torque selection unit 16 has a function to select a value to be recorded out of the disturbance torque values collected depending on the operational status of the robot 1. In particular, the disturbance torque selection unit 16 calculates a change from a reference value of each of the acquired disturbance torque values, and accumulates the disturbance torque values except each disturbance torque value having the change from the reference value equal to or larger than a predetermined threshold. For example, the disturbance torque selection unit 16 may delete such a disturbance torque value having the change from the reference value equal to or larger than the predetermined threshold, or replace this value with the reference value.

Here, the disturbance torque selection unit 16 calculates a rate of change with respect to the reference value as the change from the reference value. Specifically, the rate of change can be obtained by the following formula:

Rate of change with respect to reference value=(disturbance torque value−reference value)/reference value.

However, the change from the reference value may be derived not only from the rate of change with respect to the reference value but also from calculation of a difference between the disturbance torque value and the reference value. Moreover, still another numerical value may be calculated when that numerical value represents the change from the reference value.

Meanwhile, although the disturbance torque selection unit 16 uses an average value of recent disturbance torque values as the reference value, the disturbance torque selection unit 16 may also use a median value or a variance value instead of the average value. In addition, the threshold to be compared with the change from the reference value is a threshold for determining one-off abnormal values. Accordingly, the threshold may be set to such a value that can reliably exclude each one-off abnormal value by reference to one-off abnormal values that occurred in the past.

The disturbance torque database 17 has a function to sequentially store the disturbance torque values selected by the disturbance torque selection unit 16. As a consequence, the disturbance torque database 17 accumulates previous disturbance torque values.

The failure diagnosis unit 18 has a function to execute a failure diagnosis of the robot 1 actively based on the disturbance torque values accumulated by the disturbance torque selection unit 16. The failure diagnosis unit 18 is equipped with a memory function. Hence, the failure diagnosis unit 18 temporarily stores data acquired by accessing the disturbance torque database 17 and the maintenance record database 19, respectively, and executes the failure diagnosis based on those data. In particular, the failure diagnosis unit 18 acquires a moving position of each motion axis and a disturbance torque value applied to each motion axis at each moving position every predetermined period, and diagnoses that a failure is occurring if the acquired disturbance torque value is larger than a failure determination threshold.

The maintenance record database 19 has a function to store maintenance records on the respective joint axes when maintenance is conducted on the robot 1. As a consequence, the maintenance record database 19 accumulates previous maintenance record data.

Here, in one or more embodiments of the present invention, disturbance torque (disturbance load torque) applied to the motor 6 that drives each joint axis of the robot 1 is detected and an abnormality of the corresponding motor drive system is diagnosed as a failure of the robot based on this disturbance torque value. Procedures to obtain the disturbance torque are as follows.

Figure 2:
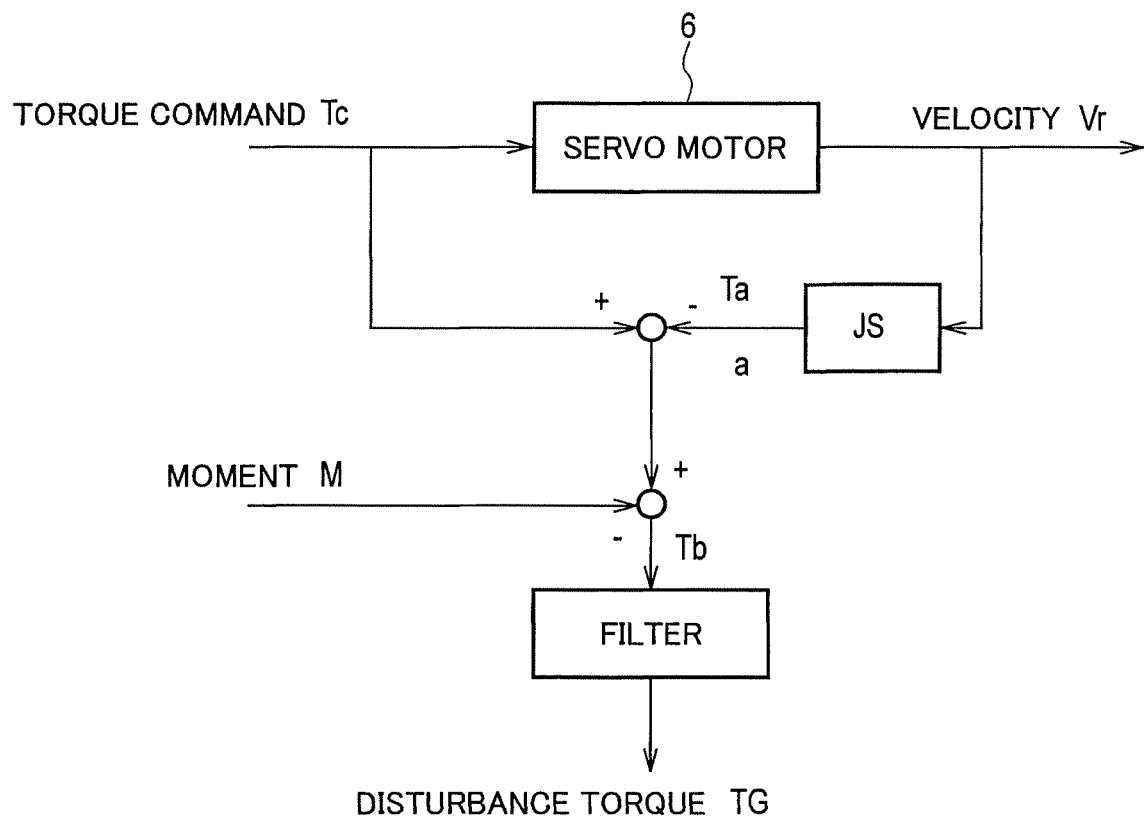
FIG. 2 is a block diagram for explaining procedures to obtain disturbance torque.

As shown in a block diagram in FIG. 2, an acceleration rate is obtained by differentiating actual velocities Vr of the motor 6 derived from velocity feedback signals from the pulse coder 7, and then acceleration torque Ta is obtained by multiplying the acceleration rate by all inertia J to be applied to the motor 6. Next, the obtained acceleration torque Ta is subtracted from a torque command Tc to the motor 6 obtained by velocity loop processing by the servo control unit 11, and a moment M is further subtracted therefrom to obtain disturbance torque Tb. Thereafter, irregular components of the disturbance are removed by conducting given filtering processing, and disturbance torque TG is thus obtained. The servo control unit 11 executes the above-described processing every predetermined sampling period, thereby obtaining the disturbance torque TG.

To be more precise, the servo control unit 11 includes a register, and the register obtains an absolute position of the motor 6 by counting the position feedback pulses from the pulse coder 7 every predetermined sampling period. Accordingly, the servo control unit 11 detects the absolute position of the motor 6 from the register, and obtains the rotation angle position (the moving position) of the joint axis driven by the motor 6 from the absolute position of the motor 6. Moreover, the servo control unit 11 obtains the disturbance torque TG by performing the processing of FIG. 2 as described previously.

[Disturbance Torque Selection Processing]

Figure 3:
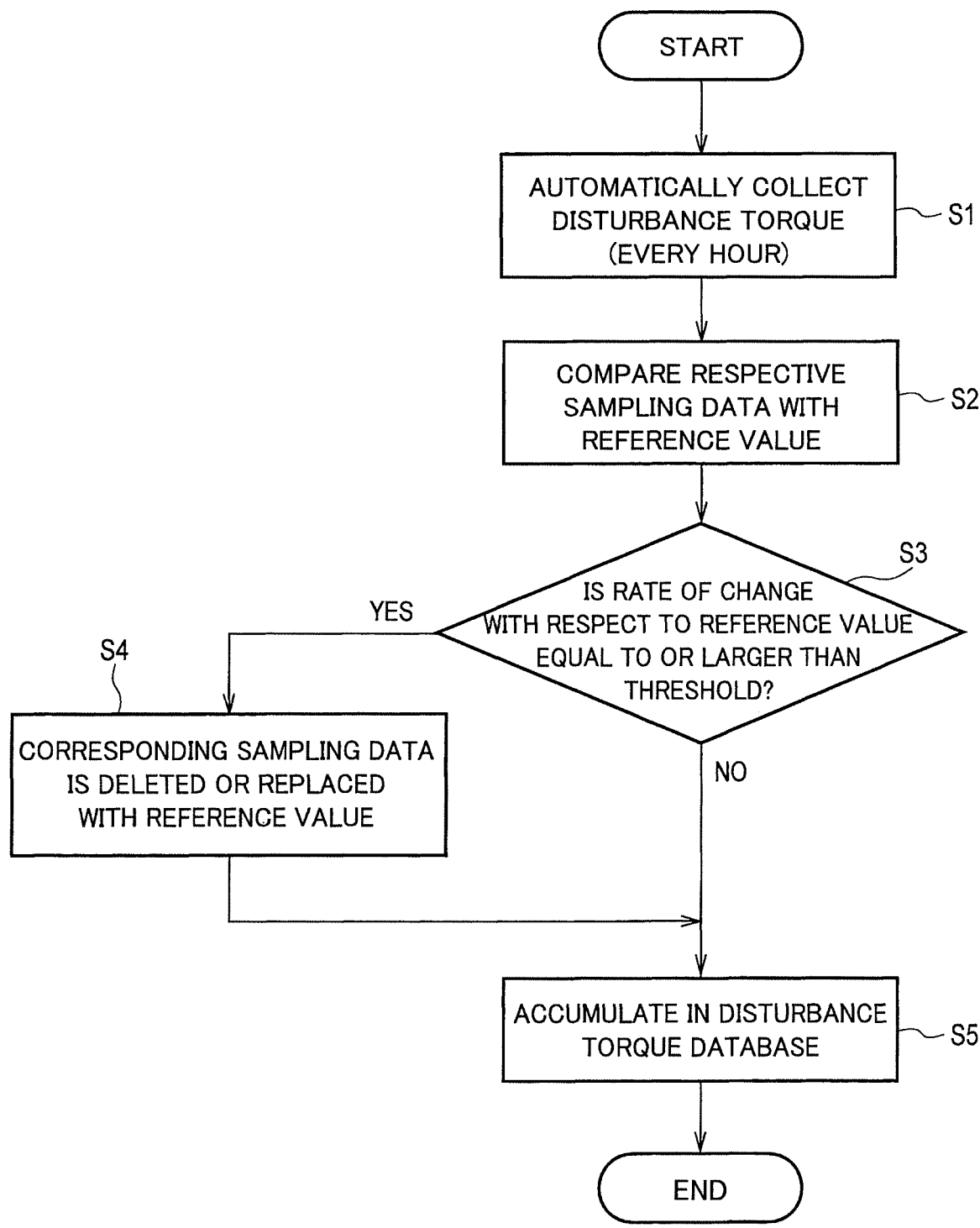
FIG. 3 is a flowchart showing procedures of disturbance torque selection processing by a failure diagnosis device according to one or more embodiments of the present invention.

Next, disturbance torque selection processing by the disturbance torque selection unit 16 of the failure diagnosis device 3 according to one or more embodiments of the present invention will be described with reference to FIG. 3. FIG. 3 is a flowchart showing procedures of the disturbance torque selection processing by the disturbance torque selection unit 16.

As shown in FIG. 3, in step S1, the disturbance torque selection unit 16 acquires the disturbance torque values by automatic collection on a regular basis, which are calculated by the robot control device 2. Each disturbance torque value represents a value at each moving position of each motion axis. In the meantime, the timing for the automatic collection is set to every hour, for example, and the disturbance torque values calculated in one hour are hence collected and acquired.

Next, in step S2, the disturbance torque selection unit 16 compares every piece of sampling data of the acquired disturbance torque values with the reference value, thereby calculating the rate of change with respect to the reference value. However, the difference between each disturbance torque value and the reference value may be used instead of the rate of change. Meanwhile, although the average value of recent disturbance torque values is used as the reference value, the median value or the variance value may be used instead of the average value.

In step S3, the disturbance torque selection unit 16 determines whether or not each rate of change with respect to the reference value is equal to or larger than the predetermined threshold. When the rate of change is equal to or larger than the threshold, the disturbance torque selection unit 16 determines that the corresponding piece of the sampling data represents a one-off abnormal value and the processing proceeds to step S4. On the other hand, when the rate of change is less than the threshold, the disturbance torque selection unit 16 determines that the corresponding piece of the sampling data does not represent a one-off abnormal value and the processing proceeds to step S5.

In step S4, the disturbance torque selection unit 16 excludes the sampling data of the disturbance torque values determined as the one-off abnormal values so as not to be accumulated in the disturbance torque database 17. Here, the corresponding sampling data may be deleted or replaced with the reference value. Alternatively, if the reference value is not the average value of the recent disturbance torque values, then the corresponding sampling data may be replaced with the average value of the recent disturbance torque values.

In step S5, the disturbance torque selection unit 16 accumulates the sampling data of the disturbance torque values except the one-off abnormal values into the disturbance torque database 17, and then terminates the disturbance torque selection processing according to one or more embodiments of the present invention.

As a consequence of selecting the disturbance torque values in accordance with the above-described processing, the disturbance torque database 17 stores and accumulates only the disturbance torque values exclusive of the one-off abnormal values.

[Failure Diagnosis Processing]

Figure 4:
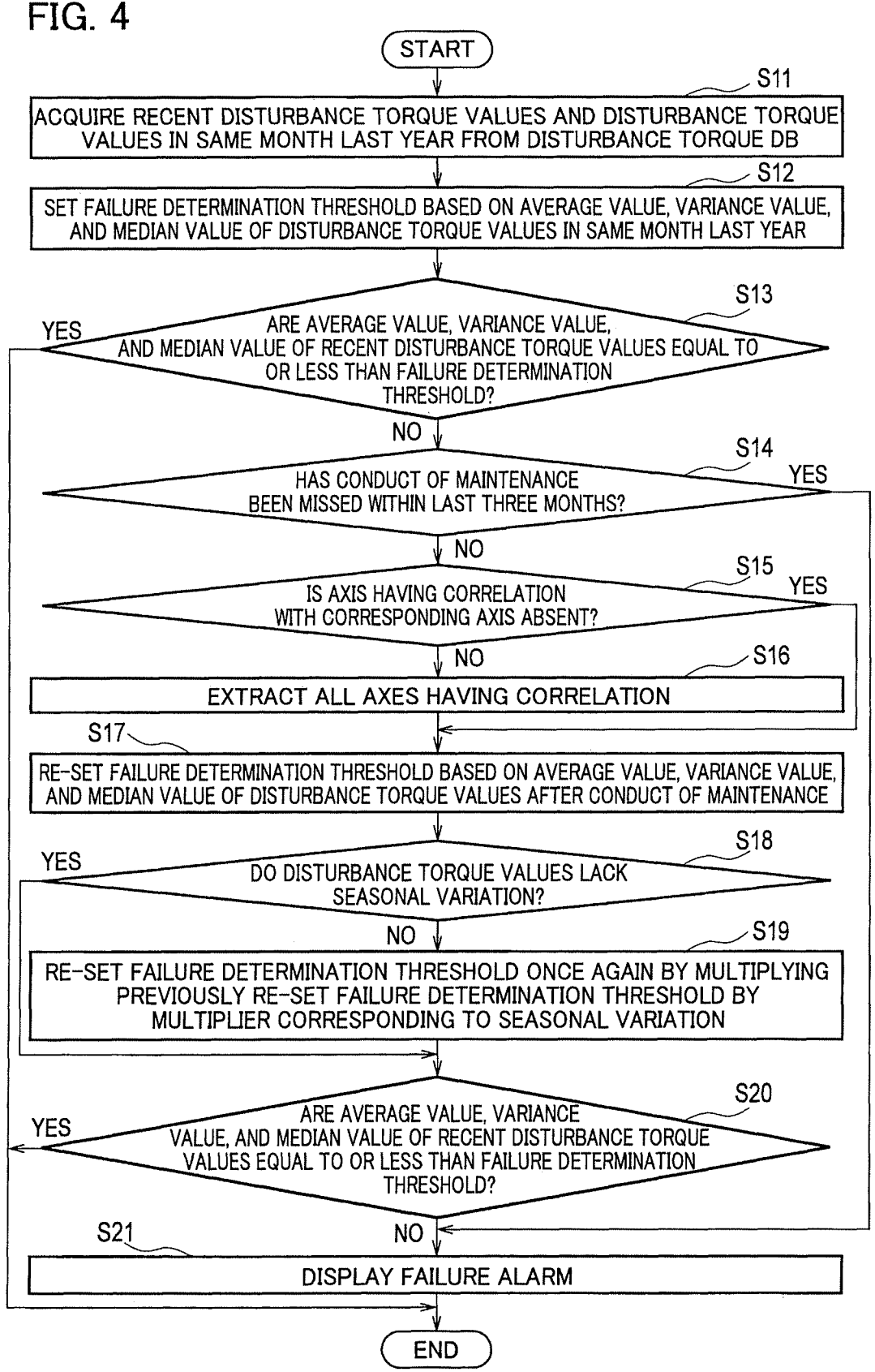
FIG. 4 is a flowchart showing procedures of failure diagnosis processing by the failure diagnosis device according to one or more embodiments of the present invention.

Next, failure diagnosis processing by the failure diagnosis unit 18 of the failure diagnosis device 3 according to one or more embodiments of the present invention will be described with reference to FIG. 4. FIG. 4 is a flowchart showing procedures of the failure diagnosis processing by the failure diagnosis unit 18.

As shown in FIG. 4, in step S11, the failure diagnosis unit 18 acquires the recent disturbance torque values as well as disturbance torque values in the same month last year as the date the diagnosis takes place in a lump from the disturbance torque database 17. In step S12, based on the disturbance torque values in the same month last year as the date the diagnosis takes place, the failure diagnosis unit 18 calculates at least one (or more) of an average value, a variance value, and a median value thereof, and then calculates and sets a failure determination threshold based on the calculated value. For example, any one of the average value, the variance value, and the median value may be set to the failure determination threshold or two or more of these values may be set to the failure determination thresholds.

In step S13, the failure diagnosis unit 18 calculates at least one (or more) of the average value, the variance value, and the median value of the recent disturbance torque values, and determines whether or not the calculated value is equal to or less than the failure determination threshold set in step S12. Then, if the calculated value out of the average value, the variance value, and the median value of the recent disturbance torque values is equal to or less than the failure determination threshold, then the failure diagnosis unit 18 determines that a failure is not occurring, and immediately terminates the failure diagnosis processing according to one or more embodiments of the present invention. On the other hand, if the calculated value out of the average value, the variance value, and the median value of the recent disturbance torque values is larger than the failure determination threshold, then the failure diagnosis unit 18 determines that there is a possibility of a failure, and the processing proceeds to step S14.

In step S14, the failure diagnosis unit 18 determines whether or not maintenance has been conducted within the last three months based on the data accumulated in the maintenance record database 19. Then, if no maintenance has been conducted, the failure diagnosis unit 18 determines that the failure is occurring, and the processing proceeds to step S21. On the other hand, the processing proceeds to step S15 when the maintenance has been conducted within the last three months.

In step S15, the failure diagnosis unit 18 determines whether or not a motion axis having a correlation of the disturbance torque value with the motion axis having the disturbance torque value determined as larger than the failure determination threshold in step S13 exist in the same robot 1. The determination as to whether or not the motion axis has the correlation is made by determining whether or not there is a change in disturbance torque value between different motion axes of the same robot before and after conducting the maintenance, for example. Then, the processing proceeds to step S16 when the motion axis having the correlation exists therein, or proceeds to step S17 if the motion axis having the correlation does not exist therein.

In step S16, the failure diagnosis unit 18 extracts all the motion axes determined as having the correlation in step S15, and the processing proceeds to step S17.

In step S17, the failure diagnosis unit 18 calculates at least one (or more) of an average value, a variance value, and a median value of disturbance torque values after the conduct of the maintenance, and calculates and re-sets a failure determination threshold based on the value.

In step S18, the failure diagnosis unit 18 determines whether or not there is a seasonal variation in the disturbance torque values of any of the joint axes. The processing proceeds to step S20 when there is not the seasonal variation or proceeds to step S19 when there is the seasonal variation. Here, the determination as to whether or not there is the seasonal variation in the disturbance torque values is made by using a degree of correlation between fluctuations in external temperature in each season and the disturbance torque values, for example. Such determination can be made by checking separately accumulated data of the external temperatures with the data of the disturbance torque values.

In step S19, the failure diagnosis unit 18 re-sets a failure determination threshold once again by multiplying the failure determination threshold that is re-set in step S17 by a constant (a coefficient) corresponding to the seasonal variation.

In step S20, the failure diagnosis unit 18 determines whether or not at least one (or more) of the average value, the variance value, and the median value of the recent disturbance torque values of the corresponding joint axis is equal to or less than either the failure determination threshold that is re-set once or the failure determination threshold that is re-set twice. Then, if the calculated value out of the average value, the variance value, and the median value of the recent disturbance torque values is equal to or less than any of these failure determination thresholds, then the failure diagnosis unit 18 determines that a failure is not occurring, and terminates the failure diagnosis processing according to one or more embodiments of the present invention. On the other hand, if the calculated value out of the average value, the variance value, and the median value of the recent disturbance torque values is larger than the corresponding failure determination threshold, then the failure diagnosis unit 18 determines that a failure is occurring, and the processing proceeds to step S21.

In step S21, the failure diagnosis unit 18 displays a failure alarm on the corresponding joint axis on a display screen of a not-illustrated monitor that is installed as an attachment to the failure diagnosis device 3, and the failure diagnosis processing according to one or more embodiments of the present invention is terminated.

As described above in detail, according to the failure diagnosis device 3 of one or more embodiments of the present invention, the change from the reference value is calculated for each of the acquired disturbance torque values, and the disturbance torque values are accumulated except the disturbance torque values each having the change from the reference value equal to or larger than the predetermined threshold. Thus, it is possible to eliminate effects of one-off abnormal values, and to improve failure diagnosis accuracy. Moreover, since it is not necessary to cooperate with a production management system, it is possible to diagnose a failure with a low-cost system configuration.

Meanwhile, according to the failure diagnosis device 3 of one or more embodiments of the present invention, the rate of change with respect to the reference value is calculated as the change from the reference value. Thus, it is possible to surely eliminate the disturbance torque values affected by the one-off abnormal values, and to improve the failure diagnosis accuracy.

Moreover, according to the failure diagnosis device 3 of one or more embodiments of the present invention, the average value of the recent disturbance torque values is defined as the reference value, so that the reference value can be set easily. Thus, it is possible to surely eliminate the disturbance torque values affected by the one-off abnormal values, and to improve the failure diagnosis accuracy.

Meanwhile, according to the failure diagnosis device 3 of one or more embodiments of the present invention, each disturbance torque value having the change from the reference value equal to or larger than the predetermined threshold is replaced with the reference value. In this way, it is possible to eliminate the effects of the one-off abnormal values without changing the number of data of the acquired disturbance torque values. Thus, it is possible to improve the failure diagnosis accuracy.

Although embodiments of the present invention are described above, it should be understood that the descriptions and the drawings constituting part of this disclosure are not intended to limit this invention. Various alternative embodiments, examples, and application techniques are within a scope of the present disclosure. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 robot
2 robot control device
3 failure diagnosis device
5 robot arm
6 servo motor (motor)
7 pulse coder
8 decelerator
9 operation integrated control unit
10, 15 communication unit
11 servo control unit
12 disturbance torque calculation unit
13 status data acquisition unit
14 servo amplifier unit
16 disturbance torque selection unit
17 disturbance torque database
18 failure diagnosis unit
19 maintenance record database
100 failure diagnosis system

The invention claimed is:

1. A failure diagnosis device for a mechanical device provided with a motor as a source to drive a motion axis element, comprising:
a memory; and
a processor coupled to the memory and programmed to:
acquire a moving position of the motion axis element and a disturbance torque value applied to the motion axis element every predetermined period,
calculate a normalized change from a reference value of each of the acquired disturbance torque values by calculating a change from the reference value thereof, and dividing the change by the reference value,
accumulate the disturbance torque values, wherein the disturbance torque values are replaced with the reference value when the normalized change from the reference value is equal to or larger than a predetermined threshold, and
diagnose whether a failure of the mechanical device is occurring when a value calculated from the accumulated disturbance torque values is larger than a failure determination threshold.

2. The failure diagnosis device according to claim 1, wherein the processor defines an average value of a predetermined number of most recent disturbance torque values as the reference value.

3. The failure diagnosis device according to claim 1, wherein the processor is further programmed to:
   calculate at least one of an average value, a variance value, and a median value of disturbance torque values acquired in a previous year during a month same as a present month, and
   calculate and set the failure determination threshold based on the at least one of the average value, the variance value, and the median value.

4. The failure diagnosis device according to claim 1, wherein the processor diagnoses whether the failure of the mechanical device is occurring when at least one of an average value, a variance value, and a median value of the accumulated disturbance torque values is larger than the failure determination threshold.

5. A mechanical device comprising:
   a motion axis element;
   a motor that drives the motion axis element; and
   a processor programmed to:
      acquire a moving position of the motion axis element and a disturbance torque value applied to the motion axis element every predetermined period,
      calculate a normalized change from a reference value of each of the acquired disturbance torque values by calculating a change thereof from the reference value, and dividing the change by the reference value,
      accumulate the disturbance torque values, wherein the disturbance torque values are replaced with the reference value when the normalized change from the reference value is equal to or larger than a predetermined threshold, and
      diagnose whether a failure of the mechanical device is occurring when a value calculated from the accumulated disturbance torque values is larger than a failure determination threshold.

6. The mechanical device according to claim 5, wherein the processor defines an average value of a predetermined number of most recent disturbance torque values as the reference value.

7. The mechanical device according to claim 5, wherein the processor is further programmed to:
   calculate at least one of an average value, a variance value, and a median value of disturbance torque values acquired in a previous year during a month same as a present month, and
   calculate and set the failure determination threshold based on the at least one of the average value, the variance value, and the median value.

8. The failure diagnosis device according to claim 5, wherein the processor diagnoses whether the failure of the mechanical device is occurring when at least one of an average value, a variance value, and a median value of the accumulated disturbance torque values is larger than the failure determination threshold.

* * * * *